United States Patent [19]

Banks

[11] 4,428,126
[45] Jan. 31, 1984

[54] APPARATUS FOR CONTINUOUSLY MONITORING THE SHAFT ALIGNMENT BETWEEN TWO ROTATING MACHINES

[75] Inventor: Burke D. Banks, West Columbia, Tex.

[73] Assignee: The Dow Chemical Company, Midland, Mich.

[21] Appl. No.: 332,436

[22] Filed: Dec. 21, 1981

[51] Int. Cl.$^3$ .............................................. G01B 7/31
[52] U.S. Cl. .................................. 33/412; 33/180 R; 33/181 R
[58] Field of Search ................. 33/412, 180 R, 181 R, 33/185 R, 288, 172 E

[56] References Cited

U.S. PATENT DOCUMENTS

| | | | |
|---|---|---|---|
| 3,664,029 | 5/1972 | Glucoft et al. | 33/180 R |
| 3,783,522 | 1/1974 | Dodd | 33/180 R |
| 3,938,254 | 2/1976 | Miller, Jr. | 33/172 E |
| 4,366,624 | 1/1983 | Bergstrom | 33/288 |

Primary Examiner—Willis Little
Attorney, Agent, or Firm—G. R. Baker

[57] ABSTRACT

An apparatus is disclosed which monitors in a continuous manner the parallel alignment between the shafts of two coupled rotating machines while the machinery is in service. The apparatus consists of a pair of anchors for securing the elements to the machines, a bar slidably mated with the anchors spanning the distance between the machines, gauge holders slidably located on the bar and gauges secured to the holders so that the measuring means is in contact with the hub of each machine. The apparatus allows both horizontal and vertical alignment measurements to be made while the machines are operating.

1 Claim, 3 Drawing Figures

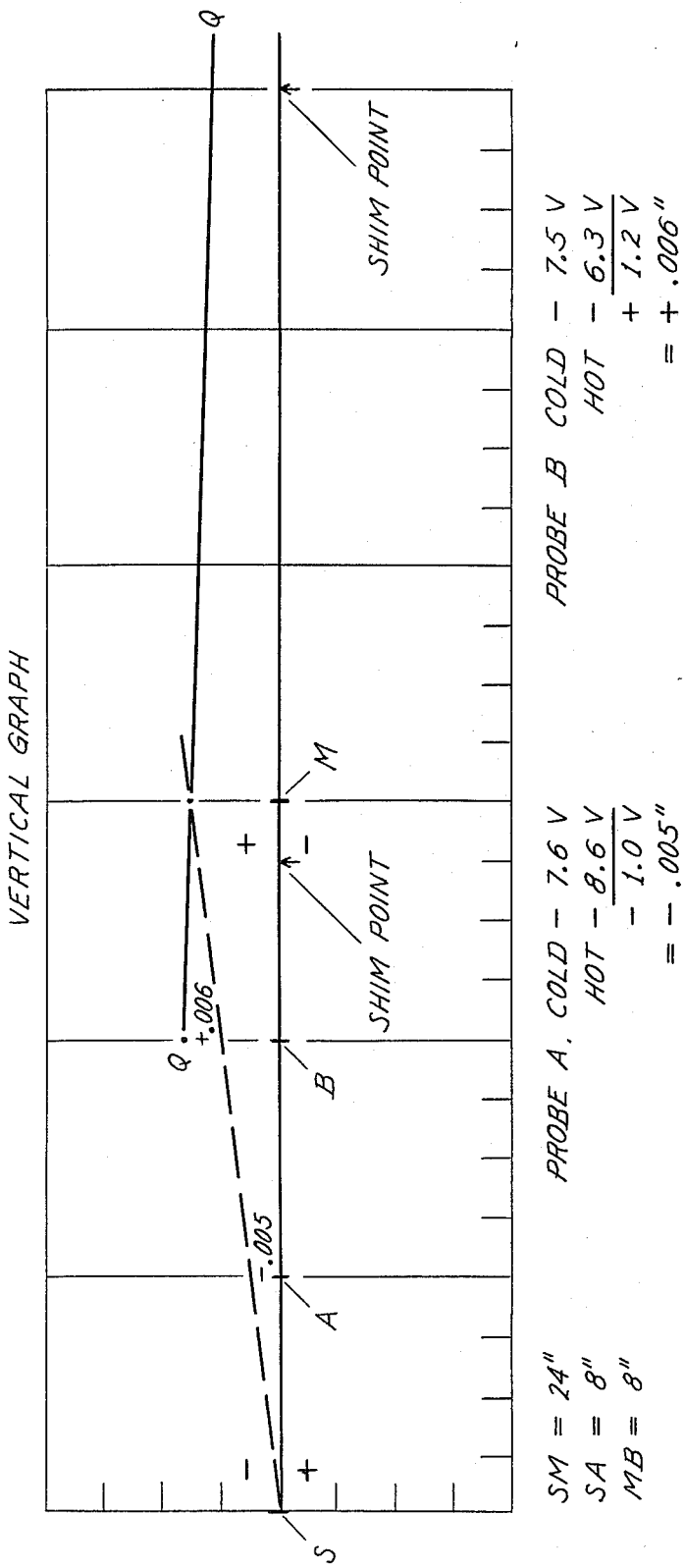

APPARATUS FOR CONTINUOUSLY MONITORING THE SHAFT ALIGNMENT BETWEEN TWO ROTATING MACHINES

BACKGROUND OF THE INVENTION

The parallel alignment of shafts of rotating equipment is at best a cumbersome, time consuming task when the equipment is static. However, when alignment measurement of coupled shafts of the equipment must be made when the equipment is running, it is difficult and many schemes have been proposed for conducting such alignment measurements. One such system is described in U.S. Pat. No. 3,783,522. Other systems correlate electonics and dial gauges, lasers and the like.

BRIEF DESCRIPTION OF THE INVENTION

An apparatus for monitoring the alignment of shafts of two connected rotating units of machinery comprised of a set of anchor members each of which can be attached to the frame or housing of a unit in a manner to position a span bar, pivotally associated therewith, in substantial parallel but displaced alignment with the shafts. A voltage biased probe or indicator is located on the span bar and held thereon by a probe holder fixedly slidably positioned on the bar. The probes are positioned on the bar to electrically engage one probe detector with the hub of one shaft and a second probe detector with the hub of the other shaft.

The apparatus is simple to construct, easy to install and gives readings during operation of the equipment which can be readily plotted to determine the alignment or misalignment of the shaft. In addition, the apparatus can be as easily mounted alongside the shaft for horizontal alignment as it can be above the shaft for vertical alignment.

The probe can be any one of the electrical indicators such as proximity probes.

Readings taken when the units are cold (in a non-operating condition) can be compared with readings taken as the unit heats up and corrections in alignment can be made if necessary. Further, since the apparatus is secured to the units, any change during operation can be detected and corrective action taken to prevent damage to the units.

The readings are plotted on graph paper to give descriptive analysis, as are most alignment methods, except that the readings here are plotted minus above the baseline and positive below the baseline at the left indicator point and the reverse at the right indicator point.

An apparatus in accordance with the present invention is illustrated in FIG. 1. The apparatus illustrated consists of a pair of machine frame or machine housing anchors, which fixedly suspend a bar in parallel but off-set or displaced alignment with the shafts, which are coupled. The bar is provided with gauge holders or hangers, slidably but capable of fixed positioning on the bar to position the gauges in contact with the hubs of the coupled shafts. The assembly may be provided with pivotally mounted bar holders as a part of the anchor members, as shown, although such is not critical to operability of the monitor.

In operation the gauges are read before the machinery is activated and then when the machinery is operating. During warm-up of the machinery due to operating the alignment of the shafts can be checked as well as after reaching operating steady state conditions. The readings from the gauges are plotted on graph paper as shown in FIG. 2. The actual mathematical calculations are set forth hereafter.

The values required to graph the alignment are the differences between the cold reading and the hot reading. Thus, to obtain the point A variance the reading hot for point A is algebraically added to the cold reading for point A, considering an electrical probe reading greater than the cold reading of A as a minus value and any electrical probe reading less than the cold reading as a plus value on the left hand reading and the reverse on the right hand reading. The voltage is converted to thousandths of an inch by the ratio of 200 MV per one thousandths inch. These values are then plotted and the alignment changes read directly from the graph.

DETAILED DESCRIPTION OF THE INVENTION

Figure 1:
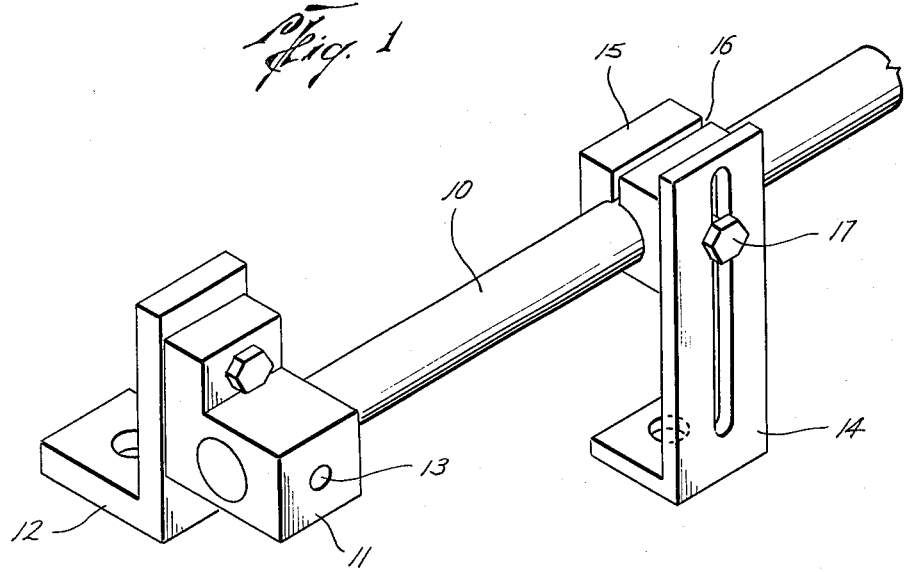
FIG. 1 illustrates one-half of the apparatus of the present invention.

In accordance with the present invention, there is provided an apparatus for monitoring the alignment of pairs of coupled shafts of various forms of rotating machinery. The apparatus comprises a pair of probes mounted in a holder slidably positionable on a bar spanning the distance between two machines and mounted through pivotal members to anchor members secured to the frame or housing of each machine. The anchor members are of any suitable shape which permits securing the anchor to the housing or frame of a machine in a position to enable the bar to traverse the shaft coupling distance to an anchor on the other machine. The anchor is preferably provided with a pivotally mounted bar holder having means to fixably secure the bar to the bar holder, e.g. a set screw. The bar is of an adequate length to span the distance between the machines in a partially displaced parallel manner and of a thickness sufficient to support the two probes and probe holders with little, if any, flexing. The probe holders are conveniently shown as L-shaped members mounted adjustably on clamp members which are adjustably slideably mounted on the bar. The probes are generally eddy current poximity probes which register D.C. millivolt changes in the probe as a result of movement of the shaft from and toward the probe.

While the elements of the monitor apparatus have been shown in the drawings as simple common structural metal shapes, it is to be understood that the shape or material of construction are neither critical nor limited to those described herein. Aluminum has been employed in those made so far, but brass, copper, steel, stainless steel and the like can be employed if the metal will standup in the environment where it is to be used. Even plastic or wood can be used if the temperature, moisture and/or chemical environment are suitable, that is, do not warp or attack the material of construction.

As shown FIG. 1 (an isometric of one-half of the total apparatus) a rod or bar, 10, is mounted on one end of a member, 11, in which the bar, 10, may slide. The member, 11, is secured to an angle member, 12, which may be fastened in a pivotal manner, as by a single bolt and nut, to a frame of a motor or pump, for example, by a bolt not shown. A set screw, 13, in member, 11, insures against movement of the rod, 10, with relation to the member, 11, once set.

Mounted on the bar, 10, are a pair of probe holders, 14. Each probe holder, 14, is comprised of a slide member, 15, which is split at one side, 16, and provided with a nut, 17, and bolt, 18, through the split side to draw the members, 15, in fixed position on the bar, 10. The probe holders, 14, are fixedly and adjustably attached to the slide members, 15, to enable the probes, 18 (shown in FIG. 2), to be positioned with its tip; to be near but not contact the hubs, 17 of the machine shafts.

From readings taken from an apparatus mounted on the top side and one horizontal side, the graphic plot of FIG. 3 was prepared.

Figure 2:
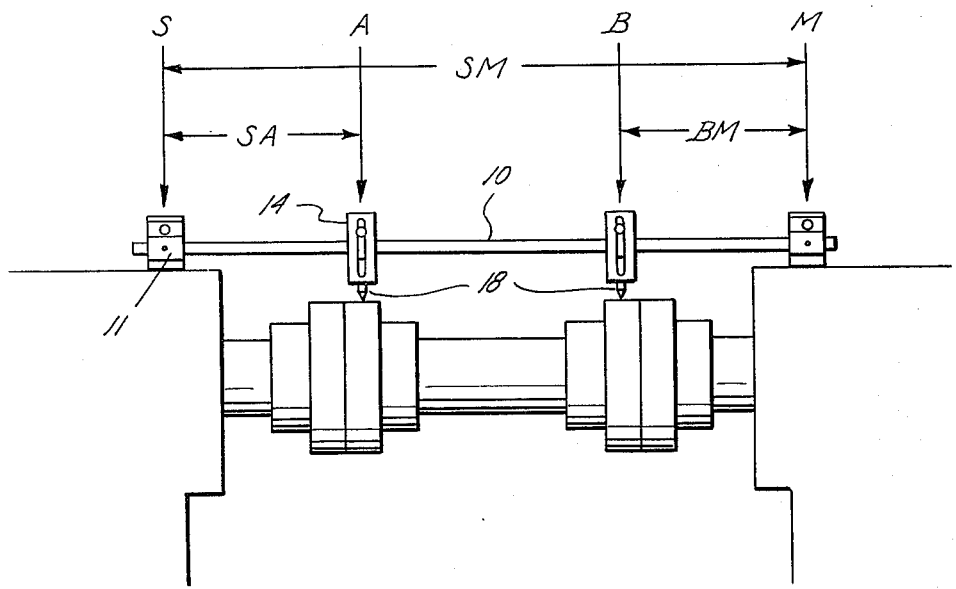
FIG. 2 represents, in elevation, the apparatus of the present invention in position over a pair of shafts; and, FIG. 3 represents the graphics of the plot from dial readings taken by an apparatus of the present invention.

In use the alignment of a coupled shaft of a motor and a pump, for example, is obtained by monitoring the apparatus of the present invention to span the coupling of the two shafts. Usually it is advantageous to employ two such apparatus, one for horizontal and one for vertical shaft misalignment or parallelism. The probes are activated and read, before the motor is operated, and noted as "cold" state readings. The motor is activated and as the motor reaches operating rpm the readings of the probe are noted again and when substantially constant the arc algebraically added to the cold reading, as shown in FIG. 3. Thus, using readings taken from a pump-motor combination using the apparatus of the present invention as shown in FIG. 2, and converting to algebraic sums, the sums are:

| Point A | Cold | 7.6v | left side |
|---------|------|------|-----------|
|         | Hot  | +(−8.6v) |        |
|         |      | −1.0v |          |
| Probe B | Cold | 7.5v | right side |
|         | Hot  | +(−6.3v) |        |
|         |      | 1.2v |           |

Each of these values is then divided by 200 to convert the volt difference into thousandths of an inch as per the conversion factor 200 MV=0.001 inch.

Thus, the A probe will convert to a −0.005 inch value and the right probe will convert to a +0.006 value. These are plotted by establishing a datum line having points S, A, B, and M graphically indicated at points along the datum line at proportionate distances from each other. As shown in FIG. 3 the points are each 8 inches apart and are plotted as each primary line as two inches.

The left hand probe reading is plotted vertically above point A as a minus value and a line drawn from point S through the graphed point above A extending to the right of point M. The right hand reading then is plotted above the intersection of the line SABM with a vertical line from point B and, being plus, is added above line SABM. A new line is then drawn through the point just constructed and the intersection of line SABM with a vertical line drawn from point M. The new line Q—Q lets the alignment of the two shafts, one to the other, to be measured in terms of the motor shaft and shimming to be measured and added to bring the shafts into more correct hot alignment.

Similar procedures may be followed for the horizontal parallelism if desired or necessary.

I claim:

1. An apparatus for monitoring the parallel alignment of rotating shafts of two machines which are coupled through their shafts, comprising
   an anchor member removably fixedly attached to each machine at an offset but parallel aligned position;
   a bar of sufficient length to span the distance between the two anchor members;
   a holder for said bar attached in a pivotal manner to each of said anchor members;
   two adjustable slide members mounted on the bar having slidably adjustable hangers depending therefrom; and
   a pair of electrical probes secured in said hangers.

* * * * *